(12) United States Patent
Gonzalez Davila

(10) Patent No.: US 9,045,676 B2
(45) Date of Patent: Jun. 2, 2015

(54) PETROLEUM ASHPHALTENE HANDLER ADDITIVE COMPOUND

(75) Inventor: Vicente Gonzalez Davila, Madero (MX)

(73) Assignee: Geo Estratos, S.A. de C.V. (MX)

( * ) Notice: Subject to any disclaimer, the term of this patent is extended or adjusted under 35 U.S.C. 154(b) by 34 days.

(21) Appl. No.: 13/805,196

(22) PCT Filed: Mar. 23, 2011

(86) PCT No.: PCT/MX2011/000036
§ 371 (c)(1),
(2), (4) Date: May 14, 2013

(87) PCT Pub. No.: WO2012/002790
PCT Pub. Date: Jan. 5, 2012

(65) Prior Publication Data
US 2013/0225454 A1    Aug. 29, 2013

(30) Foreign Application Priority Data

Jun. 28, 2010    (MX) .................... MX/a/2010/007188

(51) Int. Cl.
| | |
|---|---|
| C04B 33/04 | (2006.01) |
| C09K 8/60 | (2006.01) |
| C09K 8/524 | (2006.01) |
| C10L 1/14 | (2006.01) |
| C10L 1/16 | (2006.01) |
| C10L 1/19 | (2006.01) |
| C10L 10/00 | (2006.01) |

(52) U.S. Cl.
CPC .............. *C09K 8/524* (2013.01); *C10L 2270/10* (2013.01); *C10L 1/14* (2013.01); *C10L 1/1608* (2013.01); *C10L 1/19* (2013.01); *C10L 10/00* (2013.01); *C10L 2230/14* (2013.01); *C10L 2200/0453* (2013.01)

(58) Field of Classification Search
USPC .................................................... 507/90, 267
See application file for complete search history.

(56) References Cited

U.S. PATENT DOCUMENTS

| | | | |
|---|---|---|---|
| 6,204,420 B1 | 3/2001 | Miller et al. |
| 6,313,367 B1 | 11/2001 | Breen et al. |
| 6,368,422 B1 | 4/2002 | Breuer et al. |
| 7,312,184 B2 | 12/2007 | Boudreau |

(Continued)

FOREIGN PATENT DOCUMENTS

| | | |
|---|---|---|
| GB | 2377711 A | 1/2003 |
| WO | 0159257 A1 | 8/2001 |

(Continued)

*Primary Examiner* — Susannah Chung
*Assistant Examiner* — Atnaf Admasu

(57) ABSTRACT

This invention refers to the production and use of a petroleum asphaltene handler additive compound which when applied in heavy oil, causes asphaltenes to remain in suspension or dissolve, producing a viscosity reduction effect that prevents formation of precipitation of asphaltenic conglomerates in oil wells and storage tanks, as well as prevents pipelines from being obstructed.

The molecular binding of the components of this new additive compound is such that the final liquid may be miscible in all types of oil. There are currently solubility models using different methods for handling asphaltenes; some of which use solvents which generate other problems to the physical and chemical stability of the oil, while others, as for example with the use of steam or heat, provide a temporary solution because the oil ultimately returns to the initial conditions thereof owing to the use of reversible processes.

6 Claims, 1 Drawing Sheet

(56) References Cited

U.S. PATENT DOCUMENTS

2005/0274065 A1 12/2005 Portnoff
2007/0282118 A1 12/2007 Gupta et al.
2008/0017594 A1 1/2008 Sarshar

FOREIGN PATENT DOCUMENTS

| WO | 0174966 A1 | 10/2001 |
| WO | 2009078694 A1 | 6/2009 |

PETROLEUM ASPHALTENE HANDLER ADDITIVE COMPOUND

CROSS REFERENCE TO RELATED APPLICATIONS

This original non-provisional application claims priority to and the benefit of PCT Application Serial No. PCT/MX2011/000036, filed Mar. 23, 2011, entitled "Compuesto Aditivo Para Petróleo Manejador de Asfaltenos," claiming priority to Mexican Patent Application No. MX/a/2010/007188, filed Jun. 28, 2010, and entitled "Compuesto Aditivo Para Petróleo Manejador de Asfaltenos," both of which are incorporated by reference herein.

INVENTION BACKGROUND

As it is well known, petroleum is formed by organic compounds of varied structures and different molecular weights. It is possible to group these organic compounds into saturates, aromatics, resins and asphaltenes. The latter represent the heavy fraction and have increased in Mexico and the rest of the world causing production and conversion problems.

Asphaltenes are considered to be a fraction of heavy oil which may be soluble and are found in colloidal suspension, dispersed in a continuous phase and surrounded by resins in a micelle. Resins are responsible for keeping asphaltenes separated and maintaining stability in the system.

When there is a physical-chemical disturbance in an oil field, as it commonly occurs in production wells, the disturbance causes the concentration of resin molecules to undergo changes, causing them to leave the micelle, altering the stability of the asphaltenes that are suspended in oil, weakening the repulsive forces of the asphaltenes and generating a mutual interaction among asphaltenes.

This invention provides an innovative additive compound which can be utilized in handling these asphaltenes, allowing for improvement in heavy crude oil, increasing the production of oil wells and improving transportation in pipelines.

BRIEF DESCRIPTION OF THE FIGURES

The detailed characteristics of this innovative petroleum asphaltene handler additive compound are clearly described in the following description and in the accompanying drawings.

INVENTION DESCRIPTION

Figure 1:
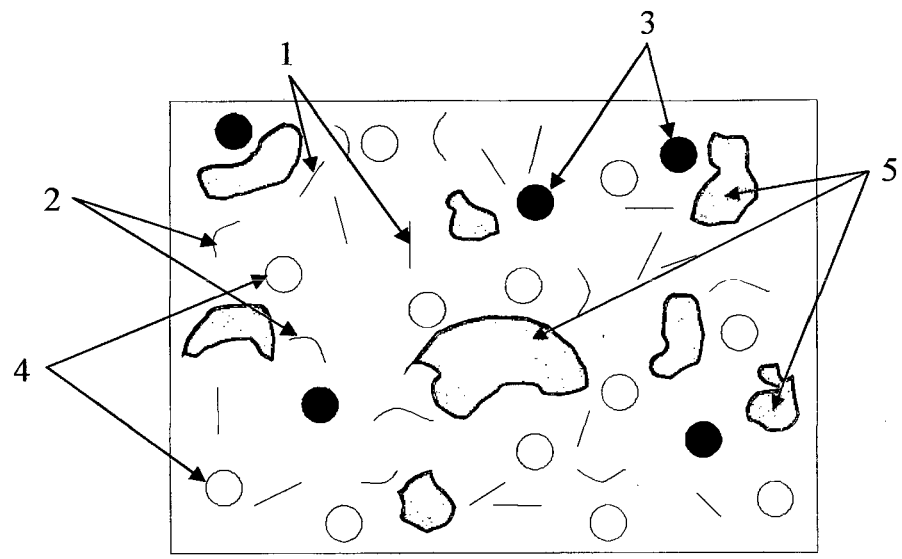
FIG. 1 depicts an illustration of oil breakdown with normally-distributed asphaltenes without any physical or chemical disturbances.

The mere presence of asphaltenes in oil is not an indication of a problem in an oil well's production or in its transportation in pipelines. There is a larger concentration of asphaltenes in heavy or extra heavy oil, and they usually remain stable under normal conditions. But this relative stability may be modified if there is a change in oil temperature and pressure. As a representative sample, FIG. 1 shows how the different oil components interact in a stable system: straight lines (1) and curvy lines (2) represent paraffin molecules; black circles (3) represent aromatic molecules; white circles (4) represent resin molecules; and the solid dark shapes (5) represent asphaltene molecules.

Figure 2:
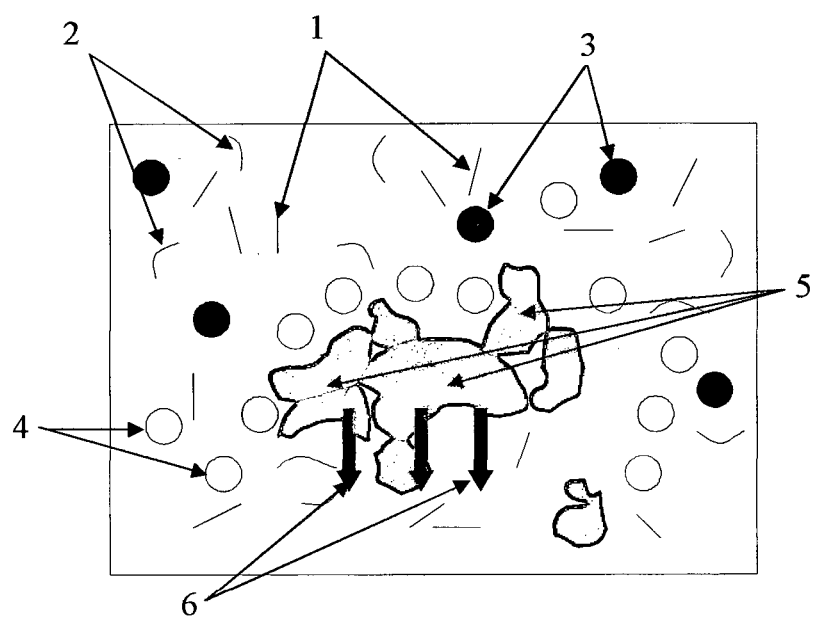
FIG. 2 depicts an illustration of modified asphaltenes forming conglomerates causing alterations in heavy oil.

FIG. 2 shows an unbalance in oil when asphaltene particles (5) are in motion and there is contact among them in resin-free areas (1, 2) modifying the concentration of asphaltene particles (5) by sticking to each other and forming an asphaltenic group with other individual particles of variable sizes. This produces a phenomenon known as aggregation where individual asphaltenes (5) adhere to other individual particles or other clusters causing the aggregates to grow. As the aggregation process occurs, the number of individual asphaltene particles (5) and asphaltenic clusters decreases due to the aggregates coming together and forming other larger and heavier aggregates. There are also some external elements, such as gravity, adsorption, emulsions, etc., causing asphaltenic particles and aggregates to have a tendency to precipitate (6) to the bottom and stick to the walls of pipelines or storage tanks, producing what is known as organic deposition.

It is possible to classify the types of oils as shown in Table 1.

TABLE 1

Types of oil according to its physical characteristics

| Oil Type | Density (g/ml) | API Gravity |
| --- | --- | --- |
| Extra Heavy | >1.0 | <10 |
| Heavy | 0.92 to 1.0 | <22 |
| Medium | 0.87 to 0.92 | <31 |
| Light | 0.83 to 0.87 | <30 |
| Super Light | <0.83 | >39 |

As mentioned above, heavy and extra heavy oil have higher contents of asphaltenes, so any unbalance may generate a major problem in its production and transportation in pipelines when a deposition of heavy fractions occurs, producing a high-viscosity effects due to its density and API gravity.

In order to improve control of the asphaltenes, an additive compound was prepared which is formed by the following substances shown in Table 2.

TABLE 2

Formulation of the asphaltene handler additive compound

| Component | Amount | Chemical Name | Effect in Oil |
| --- | --- | --- | --- |
| Toluene | 50% | Methylbenzene | Asphaltenes Dissolution |
| Methyl oleate | 21% | Methyl cis-9-octadecenoate | Asphaltenes suspension |
| Methyl linoleate | 21.5% | Methyl 9,12-octadecenoate | Asphaltenes suspension |
| Methyl palmitate | 5.5% | Methyl hexadecanoate | Asphaltenes suspension |
| Methyl stearate | 2% | Methyl octadecanoate | Asphaltenes suspension |

Describing the effect of each element on the asphaltenes.

This additive compound when prepared at a temperature of 25° C., has the following characteristics:

Melting point: −5° C.
Density: 0.86 g/ml

Three doses with the additive compound were prepared as an example in heavy oil with the following characteristics:

Test temperature: 25° C.
Initial viscosity: 15,357 cP (centipoise)
Sediment percentage: 0.1%
Emulsion percentage: 0%
Water percentage: 1%

The results obtained in the test are described in Table 3, where it is possible to observe the viscosity reduction effect on asphaltene with the additive compound in heavy oil:

TABLE 3

Viscosity reduction with the asphaltene handler additive compound

| Dose | Viscosity (cP) | Reduction Percentage |
|---|---|---|
| 1% | 10,750 | 29.99% |
| 3% | 5,011 | 67.36% |
| 5% | 3,251 | 78.83% |

The dose of the asphaltene handler additive compound depends upon the physical characteristics of the oil in which it is applied. Another additional variable influencing the dosage is the desired added cost to each barrel of oil to be treated.

It is also important to point out that this additive compound produces a permanent effect in heavy oil, where the viscosity reduction does not have any reversible effect, as in the case of heating or steam injection methods, where the physical properties of the oil ultimately returns to their initial conditions before treatment.

I claim:

1. A petroleum asphaltene handler additive compound consisting of an additive composition with a melting point of −5° C. and a density of 0.86 g/ml, prepared at a temperature of 25° C. formulated with 50% toluene, 21% methyl oleate, 21.5% methyl linoleate, 5.5% methyl palmitate and 2% methyl stearate.

2. The petroleum asphaltene handler additive compound of claim 1, wherein when applied to heavy and extra heavy oil, said additive compound stabilizes asphaltenes by keeping them in suspension and avoiding the formation of asphaltenic aggregates and their precipitation to the bottom of wells or storage tanks.

3. The petroleum asphaltene handler additive compound of claim 1, wherein when applied to heavy and extra heavy oil, said additive compound has the capacity of dissolving asphaltenes.

4. The petroleum asphaltene handler additive compound of claim 2 or 3, wherein said additive compound produces a viscosity reduction effect measured in centipoises (cP) of heavy and extra heavy oil, from 47% to 81% applying a dose between a range of 1% to 5%.

5. The petroleum asphaltene handler additive compound of claim 4, wherein said additive compound reduces the viscosity of heavy and extra heavy oil when mixed inside an oil well or during its transportation in pipelines.

6. The petroleum asphaltene handler additive compound of claim 5, wherein the reduction in viscosity of heavy and extra heavy oil produced by its application and dosage is irreversible.

* * * * *